(12) United States Patent
Tanaka et al.

(10) Patent No.: US 11,962,413 B2
(45) Date of Patent: Apr. 16, 2024

(54) WIRELESS COMMUNICATION DEVICE AND METHOD

(71) Applicant: Sony Group Corporation, Tokyo (JP)

(72) Inventors: Yusuke Tanaka, Tokyo (JP); Ryuichi Hirata, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 250 days.

(21) Appl. No.: 17/431,181

(22) PCT Filed: Feb. 27, 2020

(86) PCT No.: PCT/JP2020/007895
§ 371 (c)(1),
(2) Date: Aug. 16, 2021

(87) PCT Pub. No.: WO2020/184191
PCT Pub. Date: Sep. 17, 2020

(65) Prior Publication Data
US 2022/0166553 A1    May 26, 2022

(30) Foreign Application Priority Data

Mar. 12, 2019  (JP) .................................. 2019-044682

(51) Int. Cl.
*H04W 76/10*     (2018.01)
*H04B 1/00*      (2006.01)
(Continued)

(52) U.S. Cl.
CPC .......... *H04L 1/1671* (2013.01); *H04B 1/0064* (2013.01); *H04W 88/06* (2013.01)

(58) Field of Classification Search
CPC ... H04L 1/1671; H04L 1/1614; H04L 1/1854; H04L 1/1858; H04L 1/1896;
(Continued)

(56) References Cited

U.S. PATENT DOCUMENTS 5,896,203 A * 4/1999 Shibata .............. H04N 1/33338
358/404
6,320,862 B1 * 11/2001 Nitta ..................... H04W 76/10
370/466
(Continued)

FOREIGN PATENT DOCUMENTS

JP   2005-311920 A   11/2005
JP   2006-352711 A   12/2006
(Continued)

OTHER PUBLICATIONS

International Search Report and Written Opinion dated Jun. 2, 2020, received for PCT Application PCT/JP2020/007895, Filed on Feb. 27, 2020, 12 pages including English Translation.
(Continued)

*Primary Examiner* — Andrew Wendell
(74) *Attorney, Agent, or Firm* — XSENSUS LLP

(57) ABSTRACT

The present technology relates to a wireless communication device and method capable of improving reliability of notification regarding a reception result in communication using a plurality of bands.

The wireless communication device controls to transmit, by using any band of two or more bands, an MBO BA Setup signal containing setting information regarding a setting of a notification method for a reception result used for communication in the two or more bands, and to transmit a Data signal containing data by using the two or more bands. The present technology can be applied to wireless communication systems.

20 Claims, 12 Drawing Sheets

(51) Int. Cl.
  *H04L 1/1607* (2023.01)
  *H04W 88/06* (2009.01)
(58) Field of Classification Search
  CPC ....... H04L 1/1822; H04L 1/188; H04L 1/189;
    H04B 1/0064; H04B 1/005; H04B 3/544;
    H04W 88/06; H04W 74/006; H04W
    74/06; H04W 28/04; H04W 76/10
  See application file for complete search history.

(56) References Cited

U.S. PATENT DOCUMENTS

| | | | |
|---|---|---|---|
| 2011/0069668 A1 | 3/2011 | Chion et al. | |
| 2016/0183220 A1* | 6/2016 | Rashid | H04W 72/23 370/329 |
| 2016/0242072 A1* | 8/2016 | Hsu | H04W 28/06 |
| 2016/0242213 A1* | 8/2016 | Dabeer | H04W 74/0833 |
| 2017/0294990 A1* | 10/2017 | Xu | H04L 1/1867 |
| 2017/0347312 A1 | 11/2017 | Kang | |
| 2018/0049209 A1* | 2/2018 | Hu | H04W 92/02 |
| 2018/0054847 A1 | 2/2018 | Cariou | |
| 2018/0184233 A1 | 6/2018 | Alpert | |
| 2018/0343646 A1* | 11/2018 | Chou | H04W 16/14 |
| 2019/0288798 A1* | 9/2019 | Jiang | H04L 1/1621 |
| 2020/0077417 A1* | 3/2020 | Seok | H04W 28/04 |
| 2020/0205163 A1* | 6/2020 | Nam | H04W 72/23 |
| 2022/0166553 A1* | 5/2022 | Tanaka | H04L 1/1614 |

FOREIGN PATENT DOCUMENTS

| | | |
|---|---|---|
| JP | 2008-92116 A | 4/2008 |
| JP | 2008-263511 A | 10/2008 |
| JP | 2015-511077 A | 4/2015 |
| JP | 2018-504028 A | 2/2018 |
| JP | 2018-157535 A | 10/2018 |
| WO | 2011/096221 A1 | 8/2011 |
| WO | 2015/166959 A1 | 11/2015 |
| WO | WO-2018156194 A1 | 8/2018 |
| WO | WO-2020112020 A1 | 6/2020 |

OTHER PUBLICATIONS

Seok et al., "Enhanced Multi-Band/Multi-Channel Operation", IEEE 802.11-19/0389r0, Mar. 11, 2019, pp. 1-8.

* cited by examiner

FIG. 10

| BA Band Info | Number of Data | Buffer Size | TID_INFO | Sequence Number Info | Retry Limit | Life Time | BA Timing |

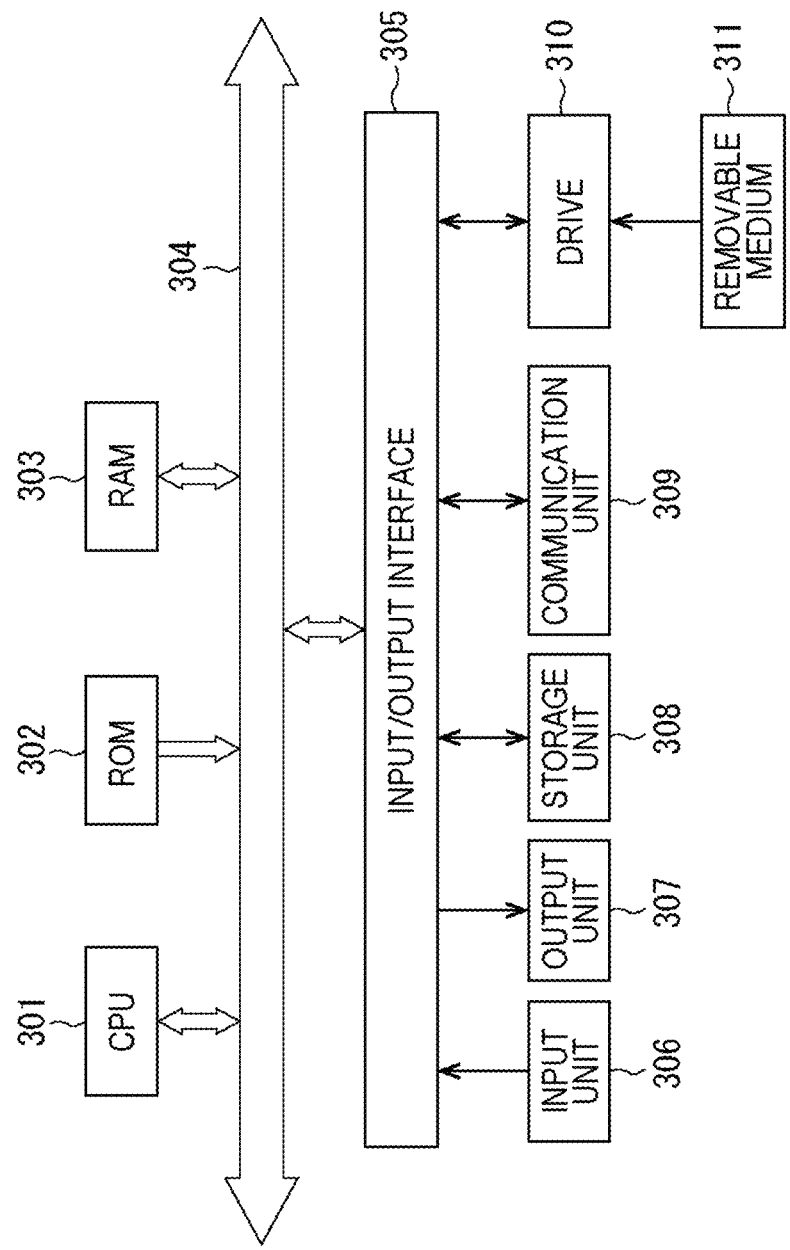

WIRELESS COMMUNICATION DEVICE AND METHOD

CROSS-REFERENCE TO RELATED APPLICATIONS

The present application is based on PCT filing PCT/JP2020/007895, filed Feb. 27, 2020, which claims priority to JP 2019-044682, filed Mar. 12, 2019, the entire contents of each are incorporated herein by reference.

TECHNICAL FIELD

The present technology relates to a wireless communication device and method, and particularly relates to a wireless communication device and method capable of improving reliability of notification regarding a reception result in communication using a plurality of bands.

BACKGROUND ART

There is an increasing demand for wireless communication with a high transmission speed and high communication quality. In order to realize a high transmission speed, for example, it is known to perform communication using a plurality of frequency bands (hereinafter, also simply referred to as bands).

In wireless communication, a plurality of bands is allocated as unlicensed bands for which it is necessary to perform Listen Before Talk to check whether or not the band is used, before transmission. Wireless communication that achieves a high transmission speed by using the plurality of bands is expected in the future. Patent Document 1 proposes a communication method that simultaneously uses a plurality of bands, in which a wireless LAN is assumed.

Whereas, as a method of achieving high communication quality, retransmission of transmission data for which communication has failed is known. Patent Document 2 describes a method of improving a transmission success probability by setting an appropriate transmission rate in order to transmit a reception result within an acquired transmission opportunity (TXOP).

CITATION LIST

Patent Document

Patent Document 1: Japanese Patent Application Laid-Open No. 2018-157535
Patent Document 2: Japanese Patent Application Laid-Open No. 2006-352711

SUMMARY OF THE INVENTION

Problems to be Solved by the Invention

In performing retransmission, a reception side notifies a transmission side of information regarding data that has been received but failed in demodulation, and the transmission side judges data to be retransmitted.

However, in communication using a plurality of bands, it is not efficient to notify, in each band, a reception result of data transmitted in each band. Furthermore, in a case where propagation characteristics of a certain band are poor, even if a reception result is notified in the band with poor propagation characteristics, it may not be notified correctly to the transmission side.

The present technology has been made in view of such a situation, and is to make it possible to improve reliability of notification regarding a reception result in communication using a plurality of bands.

Solutions to Problems

A wireless communication device of one aspect of the present technology includes: a transmission control unit configured to control to transmit, by using any band of two or more bands, a Setup signal containing setting information regarding a setting of a notification method for a reception result used for communication in the two or more bands, and to transmit a Data signal containing data by using the two or more bands.

A wireless communication device of another aspect of the present technology includes: a reception unit configured to receive setting information regarding a setting of a notification method for a reception result regarding communication in two or more bands; and a transmission unit configured to transmit a reception result for data transmitted using the two or more bands, on the basis of the setting information.

One aspect of the present technology includes: controlling to transmit, by using any band of two or more bands, a Setup signal containing setting information regarding a setting of a notification method for a reception result used for communication in the two or more bands, and to transmit a Data signal containing data by using the two or more bands.

Another aspect of the present technology includes: receiving setting information regarding a setting of a notification method for a reception result regarding communication in two or more bands; and transmitting a reception result for data transmitted using the two or more bands, on the basis of the setting information.

BRIEF DESCRIPTION OF DRAWINGS

FIG. 10 is a view showing a format configuration example of a frame in which an MBO BA Setup signal is stored.

FIG. 12 is a block diagram showing a configuration example of a computer.

MODE FOR CARRYING OUT THE INVENTION

Figure 1:
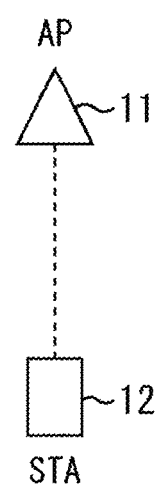
FIG. 1 is a view showing an example of an overall configuration of a wireless communication system according to an embodiment of the present technology.

Hereinafter, an embodiment for implementing the present technology will be described. The description will be given in the following order.
1. System configuration
2. Communication sequence
3. Device configuration
4. Flow of processing
5. Data configuration
6. Hardware configuration
7. Other <1. System Configuration>
<Configuration Example of Wireless Communication System>

FIG. 1 is a view showing a configuration example of a wireless communication system according to an embodiment of the present technology.

The wireless communication system of FIG. 1 is configured by connecting a base station AP to a terminal STA by wireless communication.

The base station AP includes a wireless communication device 11. The terminal STA includes a wireless communication device 12. Hereinafter, the base station AP is simply referred to as an AP, and the terminal STA is simply referred to as an STA. Note that the wireless communication devices 11 and 12 will be described later.

The AP transmits, to the STA, a multi band operation block ack setup (MBO BA Setup) signal, which is a setup signal regarding a setting of a notification method for a reception result used for communication in two or more frequency bands (hereinafter referred to as bands). The MBO BA Setup signal contains setting information regarding communication and retransmission between the AP and the STA. The MBO BA Setup signal is controlled to be transmitted using any band of two or more bands.

The AP receives a Response signal transmitted from the STA, determines a method for communication and retransmission between the AP and the STA, and divides a Data signal containing data addressed to the STA into a plurality of bands, to transmit to the STA.

The STA receives the MBO BA Setup signal transmitted from the AP, and transmits a Response signal, which is a response signal for the MBO BA Setup signal, to the AP.

The STA receives the Data signal transmitted from the AP, and demodulates the Data signal to acquire data addressed to the self. Thereafter, the STA transmits a MBO BA signal, which is a reception result signal, to the AP. At that time, the MBO BA signal is controlled to be transmitted in one or two or more bands determined by transmission and reception of the MBO BA Setup signal and the Response signal.

As described above, in the wireless communication system of FIG. 1, control is performed to transmit, by using any band of the two or more bands, an MBO BA Setup signal (Setup signal) containing setting information regarding a setting of a notification method for a reception result used for communication in the two or more bands, and to transmit a Data signal containing data by using the two or more bands.

As a result, information regarding a reception result of communication using a plurality of bands can be efficiently shared between the AP and the STA, without wasting frequency resources.

<2. Communication Sequence>
<Example of Operation Sequence (Example of Transmitting MBO BA Signal in Certain Band)>

Figure 2:
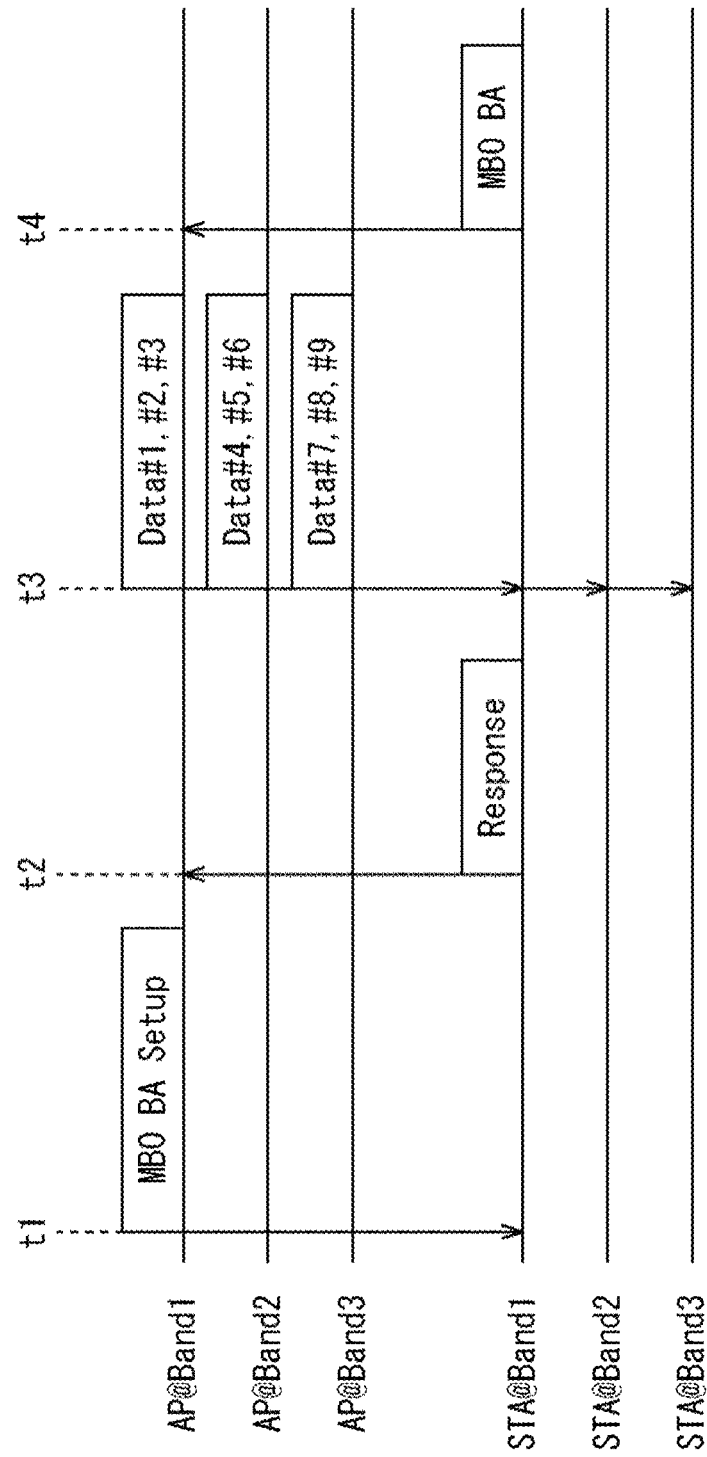
FIG. 2 is a view showing an example of an operation sequence in a case where an MBO BA signal is transmitted in a certain band.

FIG. 2 is a view showing an example of an operation sequence of a wireless communication system according to an embodiment of the present technology.

FIG. 2 shows an operation sequence in a case where an MBO BA signal is transmitted in a certain band. Furthermore, FIG. 2 shows an example in which the AP, which is the wireless communication device 11, and the STA, which is the wireless communication device 12, communicate using three bands.

Here, the AP and the STA communicate using a first band, a second band, and a third band. In FIG. 2, sequences of the AP in the first band, the second band, and the third band are indicated by AP@Band1, AP@Band2, and AP@Band3, respectively. Sequences of the STA in the first band, the second band, and the third band are indicated by STA@Band1, STA@Band2, and STA@Band3, respectively.

The AP transmits an MBO BA Setup signal to the STA at time t1. The MBO BA Setup signal contains setting information regarding communication and retransmission between the AP and STA, as described above.

The setting information may contain information regarding a band in which the AP transmits data or a band in which the STA notifies of a reception result. The information regarding a band may be information indicating a specific frequency and bandwidth, or may be information regarding an identifier that specifies a specific frequency and bandwidth. The information regarding a band may be information indicating that the band is the same as a band in which the MBO BA Setup signal is transmitted.

The setting information may contain information regarding each identifier indicating the number, a size, and a type of data transmitted and received by the AP and the STA, and an identifier indicating the order.

The setting information may contain information regarding an amount of data that can be held by the AP and STA. The setting information may contain information regarding a maximum number of retransmissions of data transmitted and received by the AP and the STA, and time until the held data is discarded.

The setting information may contain at least one of information regarding a method for the STA to notify a reception result, and information regarding a transmission timing of notification of the reception result.

In FIG. 2, the STA receives the MBO BA Setup signal transmitted from the AP, and transmits a Response signal that is for the MBO BA Setup signal, to the AP at time t2.

The Response signal may contain information regarding whether or not to perform communication and retransmission based on the setting information contained in the MBO BA Setup signal. The Response signal may contain setting information regarding communication and retransmission different from the setting information contained in the MBO BA Setup signal.

In FIG. 2, the MBO BA Setup signal and the Response signal are transmitted in the first band, but may be transmitted in the second band or the third band, or may be transmitted in two or more bands among the first to third bands.

Note that the MBO BA Setup signal and the Response signal may be transmitted and received at a time of establishing a connection between the AP and the STA.

The AP receives the Response signal transmitted from the STA, and determines a method of communication and retransmission between the AP and the STA. The AP transmits a Data signal containing data addressed to the STA, to the STA at time t3.

FIG. 2 shows an example in which data as shown below is transmitted in each band. In the first band, a Data signal containing data whose identifiers indicating the order of data are #1, #2, and #3 is transmitted. In the second band, a Data signal containing data whose identifiers indicating the order of the data are #4, #5, and #6 is transmitted. In the third band, a Data signal containing data whose identifiers indicating the order of data are #7, #8, and #9 is transmitted.

Note that the identifier indicating the order of the data transmitted in each band may be determined before the transmission of the Data signal, or may be determined by transmission and reception of the MBO BA Setup signal and the Response signal.

The Data signal may be transmitted after a certain period of time from the Response signal, or may be transmitted after a short inter frame space (SIFS) specified by IEEE 802.11 has elapsed. The Data signal is transmitted using two or more bands. The band may contain band information determined by transmission and reception of the MBO BA Setup signal and the Response signal.

The Data signal may contain information indicating that the Data signal is transmitted using two or more bands. The Data signal may be transmitted simultaneously using two or more bands, or may be transmitted in order from a band in which transmission becomes possible.

The Data signal may contain information indicating that the Data signal corresponds to a notification method for a reception result determined by the transmission and reception of the MBO BA Setup signal and the Response signal. Among the Data signals, a Data signal transmitted in a band in which the STA notifies of a reception result may contain information indicating that the Data signal is transmitted in that band.

The Data signal may contain information regarding an identifier indicating an order of a plurality of data contained in the Data signal. The Data signal may contain information regarding an identifier indicating an order of data contained in the Data signal transmitted in each band, and information regarding each band.

The Data signal may contain information regarding each identifier indicating the number, a size, and a type of data contained in the Data signal.

In FIG. 2, the STA receives, in the first to third bands, the Data signal transmitted from the AP, and demodulates the Data signal to acquire data addressed to the STA.

After acquiring the data, the STA transmits an MBO BA signal to the AP at time t4. At that time, the MBO BA signal is transmitted in a band determined by the transmission and reception of the MBO BA Setup signal and the Response signal. FIG. 2 shows an example in which the MBO BA signal is transmitted using the first band.

The MBO BA signal may contain information regarding notification that the signal contains a reception result to be used for communication in a plurality of bands. The MBO BA signal may contain information regarding an identifier indicating an order of data transmitted in each band, and a plurality of reception results in bitmap format for the data.

The MBO BA signal may contain information indicating in which band the data with respect to the reception result is transmitted. The MBO BA signal may contain information indicating that all data in a certain band or data in all bands have been successfully received.

The MBO BA signal may contain information regarding an identifier indicating a type of data corresponding to the reception result. The MBO BA signal may contain information indicating in which band the data corresponding the identifier regarding the type of data corresponding to the reception result is transmitted.

In FIG. 2, the AP receives, in the first band, the MBO BA signal transmitted from the STA, and the communication processing ends.

With the above sequence, information regarding a reception result of communication using a plurality of bands can be efficiently shared between the AP and the STA, without wasting frequency resources.

<Another Example of Operation Sequence (Example of Transmitting MBO BA Signal in Plurality of Bands)>

Figure 3:
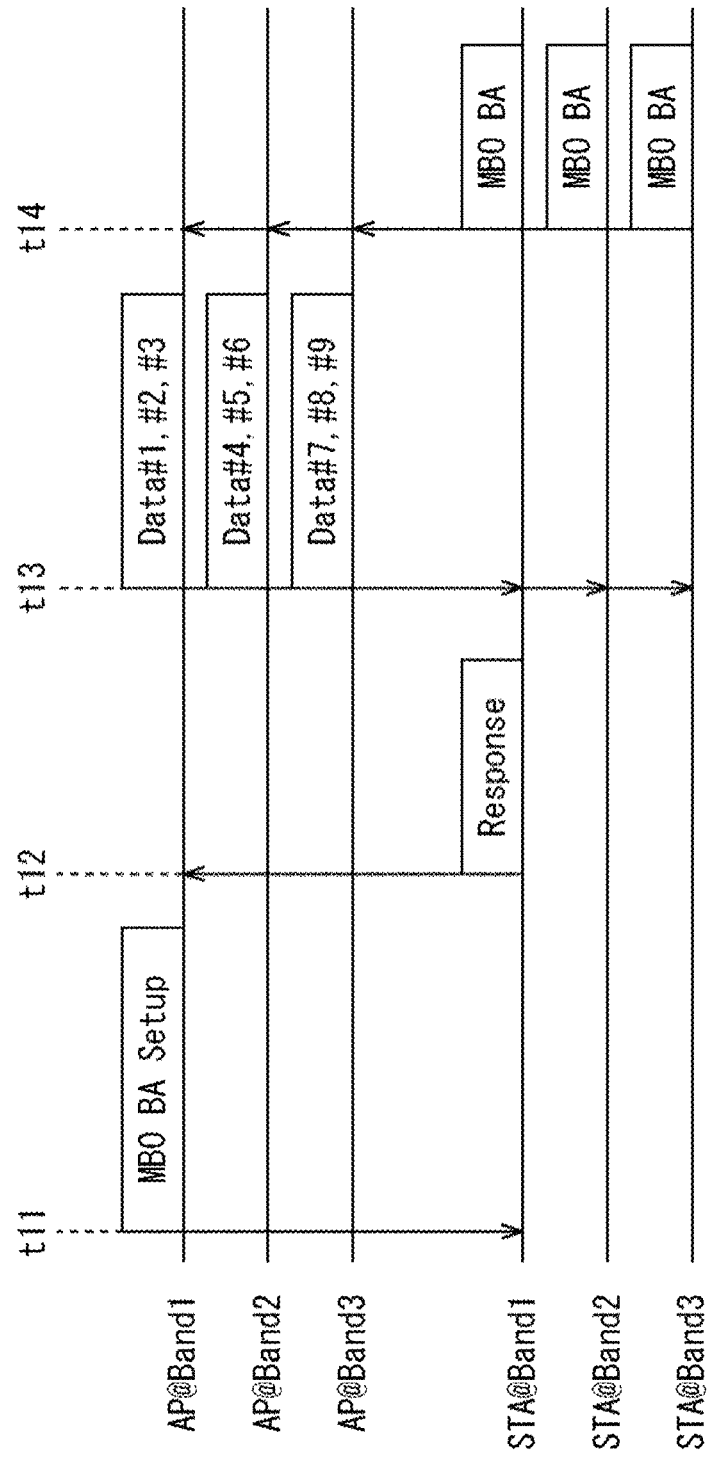
FIG. 3 is a view showing an example of an operation sequence in a case where an MBO BA signal is transmitted in a plurality of bands.

FIG. 3 is a view showing an example of an operation sequence in a case where an MBO BA signal is transmitted in a plurality of bands.

An MBO BA Setup signal, a Response signal, and a Data signal in FIG. 3 are to be configured in a similar manner to the MBO BA Setup signal, the Response signal, and the Data signal in FIG. 2 described above.

The AP transmits the MBO BA Setup signal to the STA at time t11.

The STA receives the MBO BA Setup signal transmitted from the AP, and transmits the Response signal that is for the MBO BA Setup signal, to the AP at time t12.

The AP receives the Response signal transmitted from the STA, and determines a method of communication and retransmission between the AP and the STA. The AP transmits the Data signal containing data addressed to the STA, to the STA at time t13.

The STA receives, in the first to third bands, the Data signal transmitted from the AP, and demodulates the Data signal to acquire data addressed to the STA.

After acquiring the data, the STA transmits the MBO BA signal to the AP at time t14. At that time, the MBO BA signal is transmitted in all bands in which the Data signal has been transmitted.

The AP receives, in the first to third bands, the MBO BA signal transmitted from the STA, and the communication processing ends.

In the case of FIG. 3, the MBO BA signal may contain the same information containing a reception result for the Data signal transmitted in all bands.

The MBO BA signal may contain information containing reception results for a Data signal transmitted in a band in which the MBO BA signal has been transmitted and a Data signal transmitted in another band. For example, the MBO BA signal transmitted in the first band may contain reception results for the Data signals transmitted in the first band, the second band, and the third band. Furthermore, the MBO BA signals transmitted in the second band and the third band may contain reception results for the Data signals transmitted in the second band and the third band, respectively.

The above sequence can give redundancy to information regarding a reception result, and enables the information regarding the reception result to be shared between the AP and the STA with high reliability.

<Another Example of Operation Sequence (Example of Transmitting MBO BA Signal in Band Having Good Propagation Characteristics)>

Figure 4:
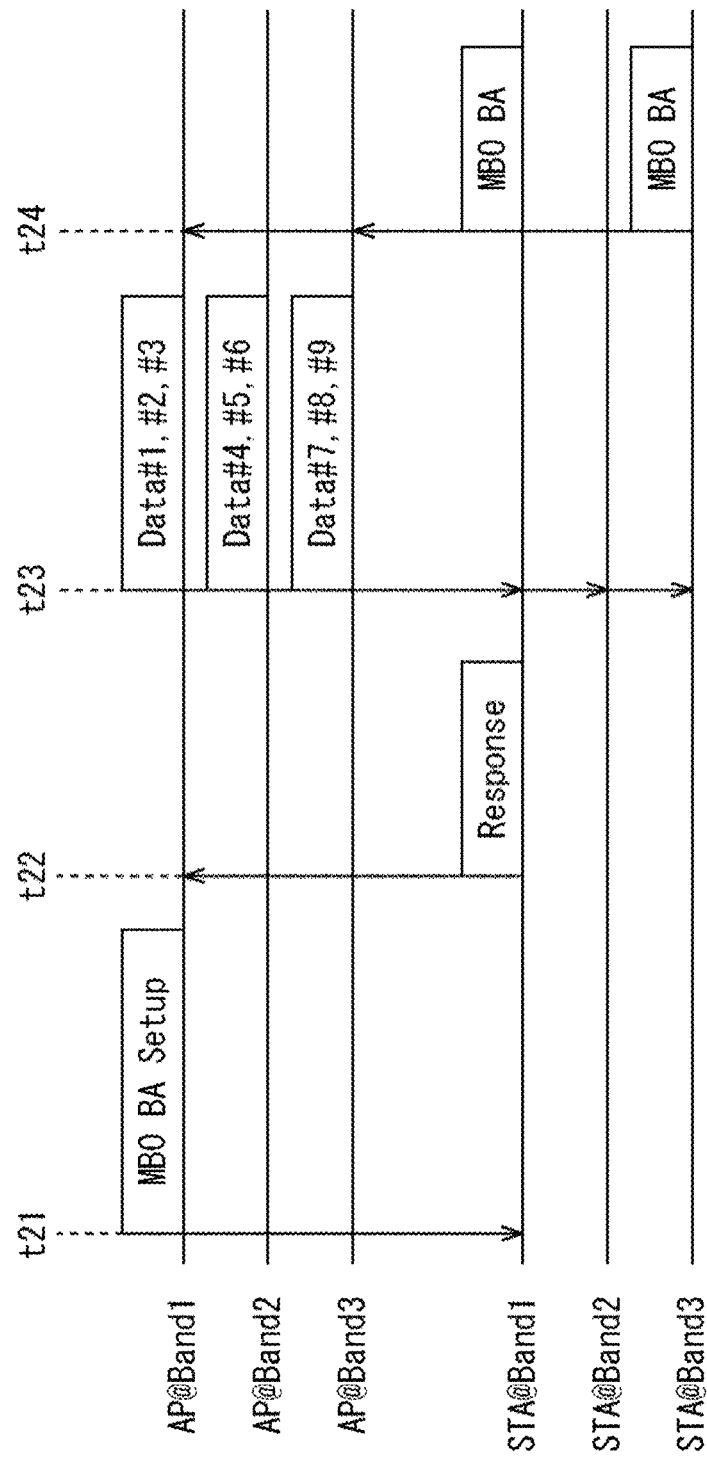
FIG. 4 is a view showing an example of an operation sequence in a case where an MBO BA signal is transmitted in a band having good propagation characteristics.

FIG. 4 is a view showing an example of an operation sequence in a case where an MBO BA signal is transmitted in a band having good propagation characteristics.

An MBO BA Setup signal, a Response signal, and a Data signal in FIG. 4 are to be configured in a similar manner to the MBO BA Setup signal, the Response signal, and the Data signal in FIG. 2 described above.

The AP transmits the MBO BA Setup signal to the STA at time t21.

The STA receives the MBO BA Setup signal transmitted from the AP, and transmits the Response signal that is for the MBO BA Setup signal, to the AP at time t22.

The AP receives the Response signal transmitted from the STA, and determines a method of communication and retransmission between the AP and the STA. The AP transmits a Data signal containing data addressed to the STA, to the STA at time t23.

The STA receives, in the first to third bands, the Data signal transmitted from the AP, and demodulates the Data signal to acquire data addressed to the STA. At that time, the STA judges whether or not propagation characteristics are low for all bands.

The judgement of the propagation characteristics may be determined on the basis of reception power and a signal interference noise power cost, of the Data signal transmitted in the band. The judgement of the propagation characteristics may be determined on the basis of a success/failure ratio of demodulation of data contained in the Data signal. The judgement of the propagation characteristics may be determined on the basis of a magnitude relationship of the success/failure ratio of demodulation of data contained in the Data signal with a predetermined threshold value set in advance.

The judgement of propagation characteristics may be determined on the basis of whether or not a Data signal has been detected in a band where the Data signal is expected to be transmitted, from information of a transmission band of a Data signal determined by transmission and reception of the MBO BA Setup signal and the Response signal. Alternatively, the judgement of propagation characteristics may be determined on the basis of whether or not a Data signal has been detected in a band where the Data signal is expected to be transmitted, from information of a transmission band of a Data signal contained in the Data signal received in another band.

The STA transmits the MBO BA signal in a band other than the band judged to have low propagation characteristics, at time t24. The STA may store a reception result in the band judged to have low propagation characteristics, in the MBO BA signal transmitted in another band, to transmit.

FIG. 4 shows an example in which the STA judges that the propagation characteristics of the second band are low, and transmits the MBO BA signal in the first band and the third band, but does not transmit in the second band. At least one of the MBO BA signals transmitted in the first band or the third band contains a reception result of the Data signal in the second band.

The AP receives, in the first band and the third band, the MBO BA signal transmitted from the STA, and the communication processing ends.

The sequence described above makes it possible to avoid transmission of information regarding a reception result in a band with poor propagation characteristics, and share information regarding a reception result between the AP and the STA with high reliability. Furthermore, the AP can know a band having poor propagation characteristics, and can transmit data requiring retransmission in a band having good propagation characteristics.

<Another Example of Operation Sequence (Example of Transmitting Same Data Signal in Plurality of Bands)>

Figure 5:
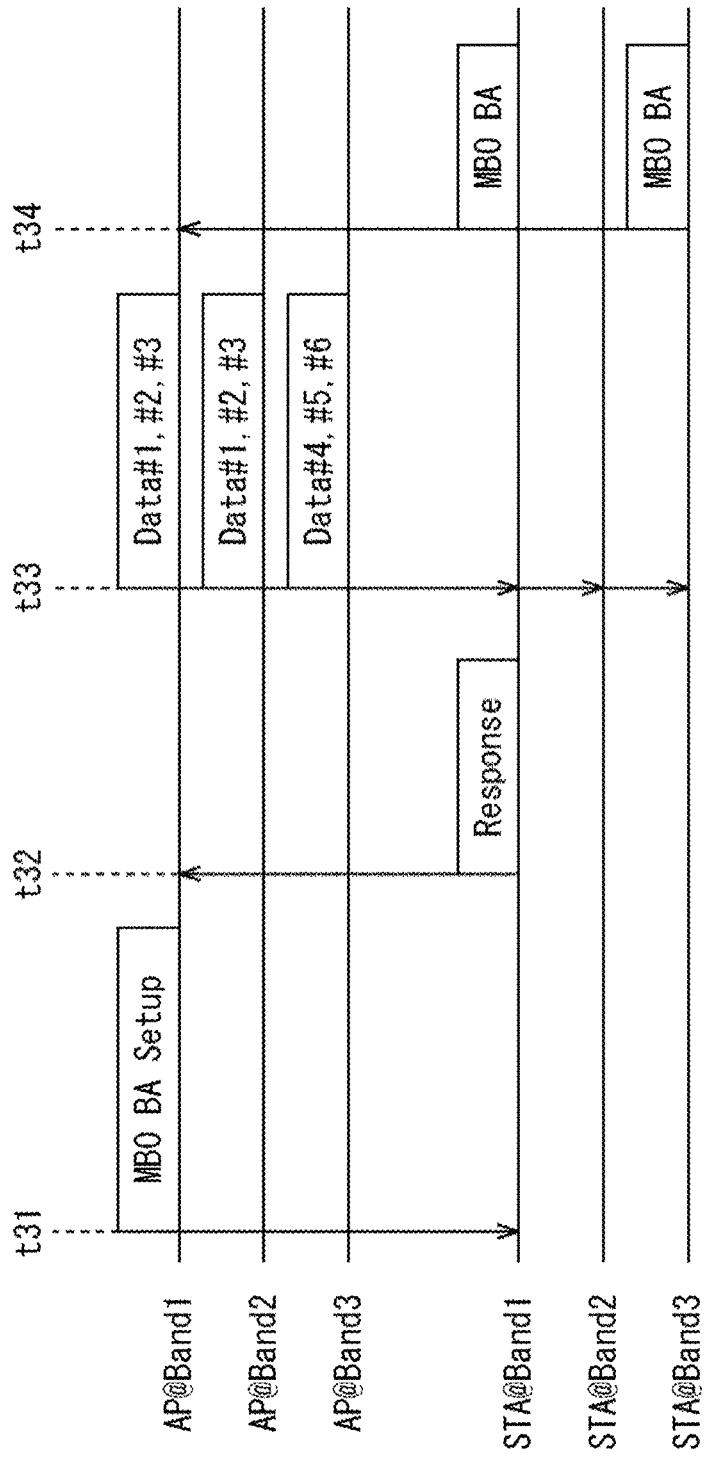
FIG. 5 is a view showing an example of an operation sequence in a case where the same Data signal is transmitted in a plurality of bands.

FIG. 5 is a view showing an example of an operation sequence in a case where the same Data signal is transmitted in a plurality of bands.

An MBO BA Setup signal, a Response signal, and a MBO BA signal in FIG. 5 are to be configured in a similar manner to the MBO BA Setup signal, the Response signal, and the MBO BA signal in FIG. 2 described above.

The AP transmits the MBO BA Setup signal to the STA at time t31.

The STA receives the MBO BA Setup signal transmitted from the AP, and transmits the Response signal that is for the MBO BA Setup signal, to the AP at time t32.

The AP receives the Response signal transmitted from the STA, and determines a method of communication and retransmission between the AP and the STA. The AP transmits a Data signal containing data addressed to the STA, to the STA at time t33.

FIG. 5 shows an example in which data as shown in the following is transmitted in each band. In the first band, a Data signal containing data whose identifiers indicating the order of data are #1, #2, and #3 is transmitted. In the second band, a Data signal containing data whose identifiers indicating the order of the data are #1, #2, and #3 is transmitted. In the third band, a Data signal containing data whose identifiers indicating the order of data are #4, #5, and #6 is transmitted.

That is, the AP transmits the same data in the first band and the second band. Other descriptions of the Data signal are similar to those of the example of FIG. 2 described above.

The STA receives, in the first to third bands, the Data signal transmitted from the AP, and demodulates the Data signal to acquire data addressed to the STA. At that time, the STA judges whether or not propagation characteristics are low for all the bands, similarly to the example of FIG. 4.

The STA transmits the MBO BA signal in a band (for example, the first band and the third band) other than the band judged to have low propagation characteristics, at time t34. The STA may store a reception result in the band judged to have low propagation characteristics, in the MBO BA signal transmitted in another band, to transmit.

The AP receives, in the first band and the third band, the MBO BA signal transmitted from the STA, and the communication processing ends.

The above sequence makes it possible to efficiently share information regarding a reception result between the AP and the STA without wasting frequency resources.

Note that, in any of the examples described above, the STA that transmits a reception result for the same data by using two or more bands has the same contents of the reception results contained in the two or more MBO BA signals.

In a case where the reception results contained in the two or more MBO BA signals transmitted from the STA are different, the AP determines a single reception result. The reception result may be determined by giving priority to a reception result contained in the MBO BA signal received in a specific band.

The determination of the reception result may be performed by giving priority to a numerically superior reception result among the plurality of reception results contained in the plurality of MBO BA signals. For example, in a case where a reception result for Data #1 is successful in demodulation of the MBO BA signals received in the first and second bands and failure in demodulation of the MBO BA signal received in the third band, it is determined as successful demodulation.

In the determination of the reception result, it may be determined as successful demodulation in a case where one or more of the reception results among the plurality of reception results contained in the plurality of MBO BA signals indicate that demodulation is successful. For example, in a case where a reception result for Data #1 is successful in demodulation of the MBO BA signals received in the first and second bands and failure in demodulation of the MBO BA signal received in the third band, it is determined as successful demodulation.

In the determination of the reception result, in a case where one or more of the reception results among the plurality of reception results contained in the plurality of MBO BA signals indicate that demodulation is failed, it may be determined as failed demodulation. For example, in a case where a reception result for Data #1 is successful in demodulation of the MBO BA signals received in the first and second bands and failure in demodulation of the MBO BA signal received in the third band, it is determined as failed demodulation.

<3. Configuration Example of Device>

Figure 6:
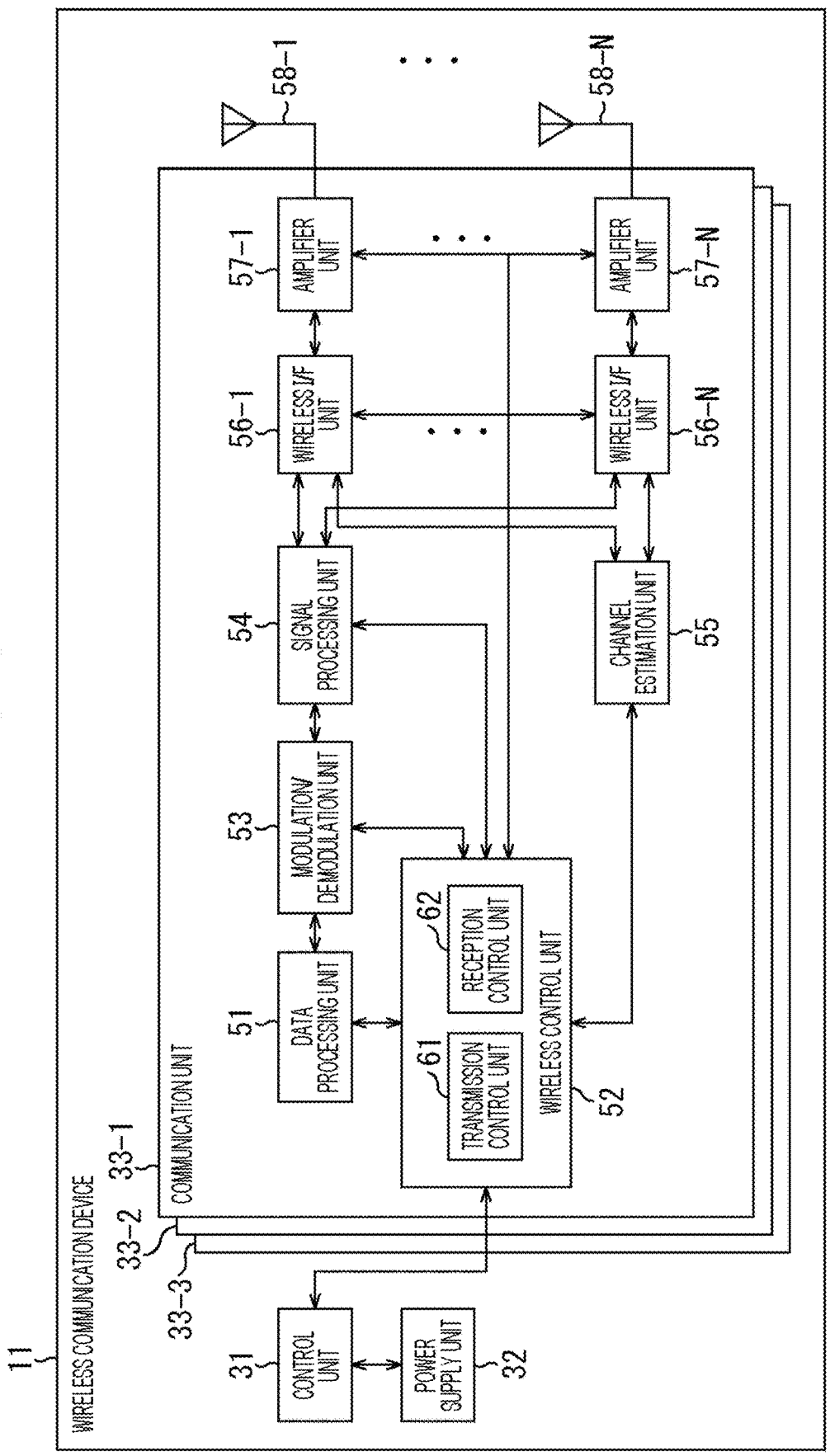
FIG. 6 is a block diagram showing a configuration example of a wireless communication device.

FIG. 6 is a block diagram showing a configuration example of the wireless communication device 11.

The wireless communication device 11 shown in FIG. 6 is a device that operates as the AP.

The wireless communication device 11 includes a control unit 31, a power supply unit 32, and communication units 33-1 to 33-3. In the example of FIG. 6, three communication units 33-1 to 33-3 are included. The communication units 33-1 to 33-3 may be realized as an LSI.

The communication units 33-1 to 33-3 each transmit and receive data. The communication units 33-1 to 33-3 each include a data processing unit 51, a wireless control unit 52, a modulation/demodulation unit 53, a signal processing unit 54, a channel estimation unit 55, wireless interface (I/F) units 56-1 to 56-N, amplifier units 57-1 to 57-N, and antennas 58-1 to 58-N.

The wireless I/F unit 56-1 to 56-N, the amplifier unit 57-1 to 57-N, and the antenna 58-1 to 58-N each having the same branch number may be made as one set, and one or more sets may be components. Note that functions of the amplifier units 57-1 to 57-N may be included in the wireless I/F units 56-1 to 56-N.

Note that, hereinafter, in a case where it is not necessary to distinguish the communication units 33-1 to 33-3, they will be appropriately referred to as a communication unit 33. Furthermore, in a case where it is not necessary to distinguish the wireless I/F unit 56-1 to 56-N, the amplifier unit 57-1 to 57-N, and the antenna 58-1 to 58-N, they are appropriately referred to as a wireless I/F unit 56, an amplifier unit 57, and an antenna 58.

The control unit 31 includes a central processing unit (CPU), a read only memory (ROM), a random access memory (RAM), and the like. The control unit 31 executes a program stored in ROM or the like, to control the power supply unit 32 and the wireless control unit 52.

The power supply unit 32 includes a battery power supply or a fixed power supply, and supplies power to the entire wireless communication device 11.

At a time of transmission, the data processing unit 51 generates a packet for wireless transmission by using data supplied from an upper layer. The data processing unit 51 performs processing, on the generated packet, such as adding a header for media access control (MAC) and adding an error detection code, and outputs the processed data to the modulation/demodulation unit 53.

At a time of reception, the data processing unit 51 performs MAC header analysis, packet error detection, reorder processing, and the like on data supplied from the modulation/demodulation unit 53, and outputs the processed data to an upper layer of the self.

The wireless control unit 52 exchanges information between each of units of the wireless communication device 11, and controls each of units in the communication unit 33. The wireless control unit 52 includes a transmission control unit 61 and a reception control unit 62.

At a time of transmission, if necessary, the transmission control unit 61 performs parameter setting in the modulation/demodulation unit 53 and the signal processing unit 54, packet scheduling in the data processing unit 51, and parameter setting and transmission power control of the wireless I/F unit 56 and the amplifier unit 57. At a time of reception, if necessary, the reception control unit 62 performs parameter setting of the modulation/demodulation unit 53 and the signal processing unit 54, and parameter setting of the wireless I/F unit 56 and the amplifier unit 57.

Furthermore, in particular, the transmission control unit 61 transmits an MBO BA Setup signal containing setting information regarding a setting of a notification method for a reception result used for communication in two or more bands, and controls each unit so as to transmit a Data signal by using two or more bands. The reception control unit 62 controls each unit so as to receive a response signal for the MBO BA Setup signal and an MBO BA signal for the Data signal.

Note that, at least a part of these operations of the wireless control unit 52 may be performed by the control unit 31 instead of the wireless control unit 52. Furthermore, the control unit 31 and the wireless control unit 52 may be configured as one block.

At a time of transmission, the modulation/demodulation unit 53 encodes, interleaves, and modulates data supplied from the data processing unit 51 on the basis of a coding method and a modulation method set by the control unit 31, to generate a data symbol stream. The modulation/demodulation unit 53 outputs the generated data symbol stream to the signal processing unit 54.

At a time of reception, the modulation/demodulation unit 53 outputs data resulting from demodulation, deinterleaving, and decoding on the data symbol stream supplied from the signal processing unit 54, to the data processing unit 51 or the wireless control unit 52.

At a time of transmission, if necessary, the signal processing unit 54 performs signal processing to be used for spatial separation, on the data symbol stream supplied from the modulation/demodulation unit 53, and outputs one or more transmission symbol streams obtained as a result of the signal processing to each wireless I/F unit 56.

At a time of reception, the signal processing unit 54 performs signal processing on a reception symbol stream supplied from each wireless I/F unit 56, performs spatial separation of the stream as necessary, and outputs a data symbol stream obtained as a result of the spatial separation to the modulation/demodulation unit 53.

The channel estimation unit 55 calculates complex channel gain information of a propagation path from a preamble part and a training signal part, in the reception symbol stream supplied from each wireless I/F unit 56. The complex channel gain information is supplied to the modulation/demodulation unit 53 and the signal processing unit 54 via the wireless control unit 52, and used for demodulation processing in the modulation/demodulation unit 53 and space separation processing in the signal processing unit 54.

At a time of transmission, the wireless I/F unit 56 converts a transmission symbol stream from the signal processing unit 54 into an analog signal, performs filtering, up-converting to a carrier frequency, and phase control, and outputs the analog signal after the phase control to the amplifier unit 57.

At a time of reception, the wireless I/F unit 56 performs phase control, down-conversion, and reverse filtering on an analog signal supplied from the amplifier unit 57, and outputs a reception symbol stream as a result conversion into a digital signal, to the signal processing unit 54 and the channel estimation unit 55.

At a time of transmission, the amplifier unit 57 amplifies an analog signal supplied from the wireless I/F unit 56 to a predetermined power, and outputs the analog signal with amplified power to the antenna 58. At a time of reception, the amplifier unit 57 amplifies an analog signal supplied from the antenna 58 to a predetermined power, and outputs the analog signal with amplified power to the wireless I/F unit 56.

The amplifier unit 57 may include at least a part of at least one of a function at a time of transmission and a function at a time of reception in the wireless I/F unit 56. At least a part of at least one of the amplifier units 57 may be a component outside the communication unit 33.

Note that, since the configuration of the wireless communication device 12 that operates as the STA is basically similar to that of the wireless communication device 11, hereinafter, the configuration of the wireless communication device 11 will be used in the description of the wireless communication device 12.

In this case, the reception control unit 62 receives an MBO BA Setup signal, which is setting information regarding a setting of a notification method for a reception result used for communication in two or more bands, and controls each unit so as to receive a Data signal transmitted using two or more bands. The transmission control unit 61 controls each unit so as to transmit a Response signal for the MBO BA Setup signal, and the MBO BA signal that is a reception result of data, on the basis of the setting information.

<4. Flow of Processing>
<Processing of Wireless Communication Device 11 (AP)>

Figure 7:
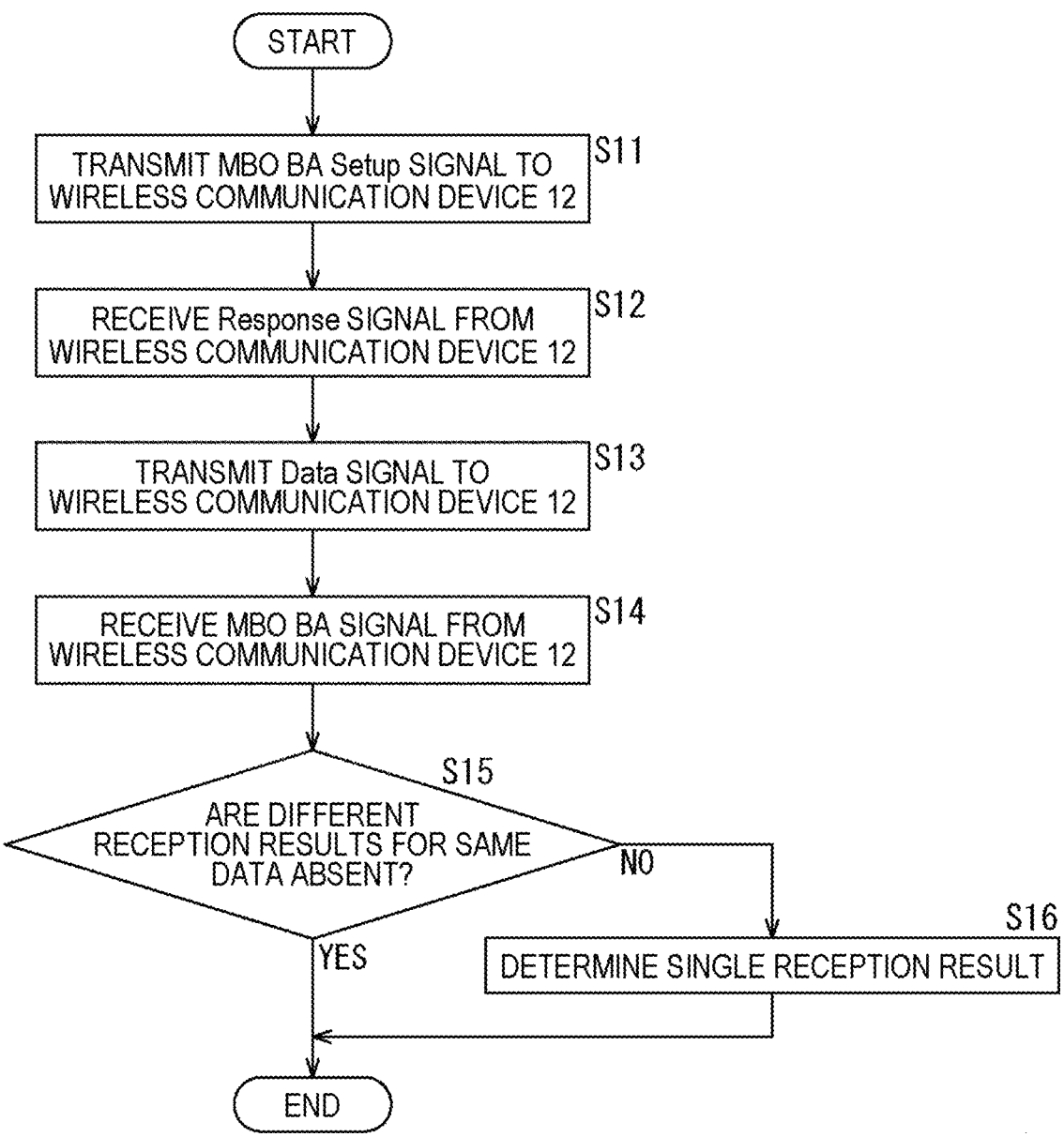
FIG. 7 is a flowchart for explaining communication processing of a wireless communication device that operates as an AP.

FIG. 7 is a flowchart for explaining communication processing of the wireless communication device 11 that operates as the AP.

In step S11, the transmission control unit 61 of the wireless communication device 11 controls each unit of the communication unit 33, and transmits an MBO BA Setup signal to the wireless communication device 12.

Upon receiving the MBO BA Setup signal, the wireless communication device 12 transmits a Response signal for the MBO BA Setup signal, to the wireless communication device 11 (step S32 in FIG. 8 described later).

In step S12, the reception control unit 62 controls each unit of the communication unit 33, and receives the Response signal transmitted from the wireless communication device 12.

In step S13, on the basis of the Response signal, the transmission control unit 61 determines a method for communication and retransmission of the wireless communication device 11 and the wireless communication device 12, controls each unit of the communication unit 33, and transmits a Data signal to the wireless communication device 12 by using two or more bands.

The wireless communication device 12 having received the Data signal transmits an MBO BA signal for the Data signal, to the wireless communication device 11 (step S42 in FIG. 8 described later).

In step S14, the reception control unit 62 controls each unit of the communication unit 33, and receives the MBO BA signal transmitted from the wireless communication device 12.

The MBO BA signal may be transmitted in a single band, for example, as described above with reference to FIG. 2 or FIG. 3, or may be transmitted in a plurality of bands as described above with reference to FIG. 4 or FIG. 5.

In step S15, the reception control unit 62 judges whether or not different reception results for the same data are absent.

In a case where there is a plurality of reception results and there are different reception results for the same data, it is judged as NO in step S15, and the process proceeds to step S16. In step S16, the reception control unit 62 determines a single reception result from the different reception results. Thereafter, the communication processing of the wireless communication device 11 ends.

Whereas, in a case where there is a single reception result, or there is a plurality of reception results and there are no different reception results for the same data, it is judged as YES in step S15, the process of step S16 is skipped, and the communication processing of the wireless communication device 11 ends.

<Processing of Wireless Communication Device 12 (STA)>

Figure 8:
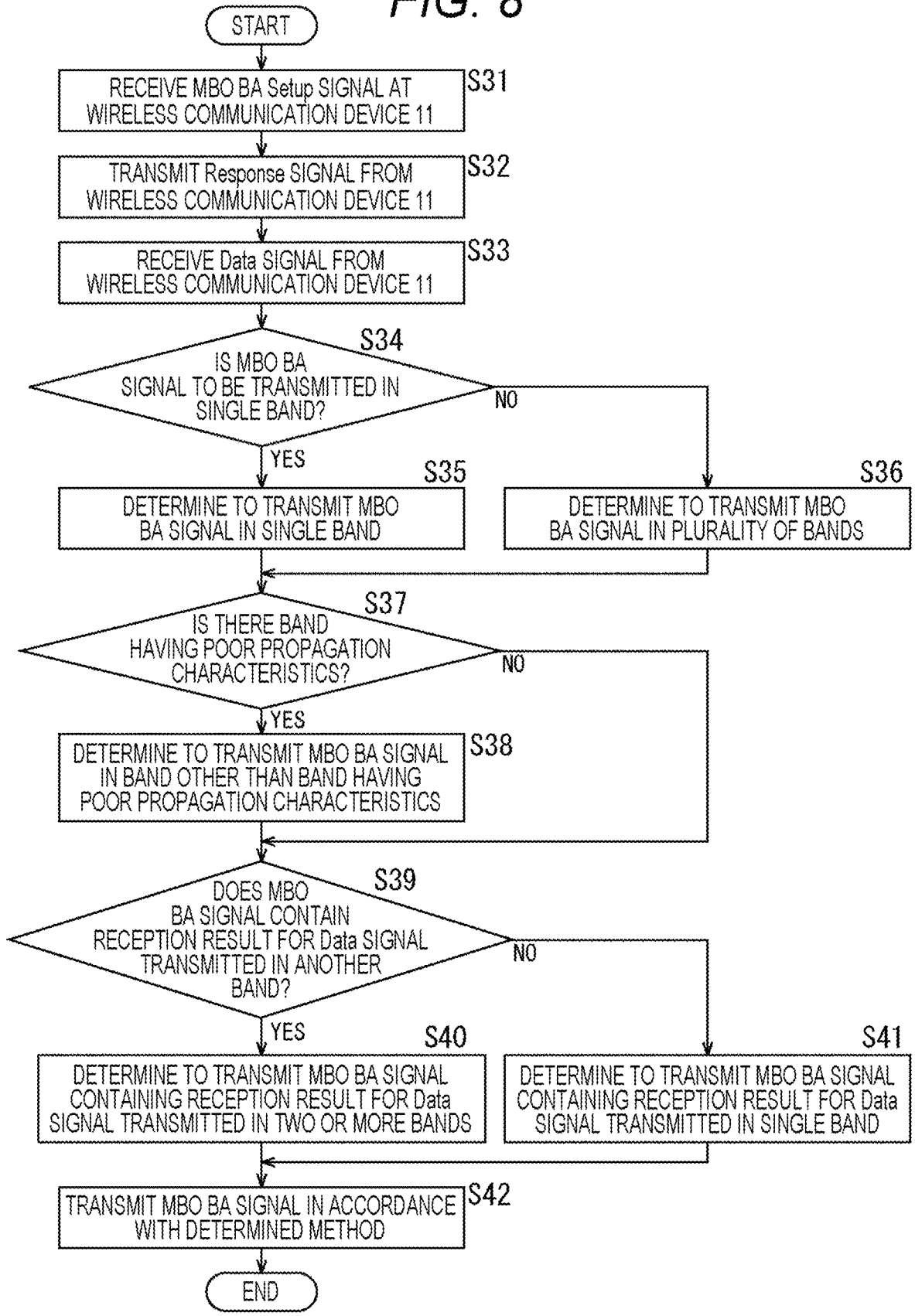
FIG. 8 is a flowchart for explaining communication processing of a wireless communication device that operates as an STA.

FIG. 8 is a flowchart for explaining communication processing of the wireless communication device 12 that operates as the STA.

The wireless communication device 11 transmits an MBO BA Setup signal to the wireless communication device 12 (step S11 in FIG. 7).

In step S31, the reception control unit 62 of the wireless communication device 12 controls each unit of the communication unit 33, and receives the MBO BA Setup signal transmitted from the wireless communication device 11.

In step S32, the transmission control unit 61 controls each unit of the communication unit 33, and transmits a Response signal for the MBO BA Setup signal, to the wireless communication device 11.

The wireless communication device 11 having received the Response signal transmits a Data signal to the wireless communication device 12 by using two or more bands (step S13 in FIG. 7).

In step S33, the reception control unit 62 controls each unit of the communication unit 33, and receives the Data signal transmitted from the wireless communication device 11.

In step S34, on the basis of the Data signal, the transmission control unit 61 judges whether or not to transmit the MBO BA signal in a single band.

In a case where it is judged in step S34 that the MBO BA signal is to be transmitted in a single band, the process proceeds to step S35. In step S35, the transmission control unit 61 determines to transmit the MBO BA signal in a single band.

In a case where it is judged in step S34 that the MBO BA signal is not to be transmitted in a single band, the process proceeds to step S36. In step S36, the transmission control unit 61 determines to transmit the MBO BA signal in a plurality of bands.

After steps S35 and S36, the process proceeds to step S37.

In step S37, as described above with reference to FIG. 4, the transmission control unit 61 judges whether or not there is a band having poor propagation characteristics, on the basis of propagation characteristics of each band at a time of receiving the Data signal. In a case where it is judged in step S37 that there is a band having poor propagation characteristics, the process proceeds to step S38.

In step S38, the transmission control unit 61 determines to transmit the MBO BA signal in a band other than the band having poor propagation characteristics. Thereafter, the process proceeds to step S39.

In a case where it is judged in step S37 that there is no band having poor propagation characteristics, step S38 is skipped and the process proceeds to step S39.

In step S39, the transmission control unit 61 judges whether or not the MBO BA signal contains a reception result for the Data signal transmitted in another band, as described above with reference to FIG. 3.

In a case where it is judged in step S39 that the MBO BA signal contains a reception result for the Data signal transmitted in another band, the process proceeds to step S40.

In step S40, the transmission control unit 61 determines to transmit the MBO BA signal containing a reception result for the Data signal transmitted in the two or more bands.

In a case where it is judged in step S39 that the MBO BA signal does not contain a reception result for the Data signal transmitted in another band, the process proceeds to step S41.

In step S41, the transmission control unit 61 determines to transmit the MBO BA signal containing a reception result for the Data signal transmitted in a single band.

After step S40 or S41, the process proceeds to step S42.

In step S42, the transmission control unit 61 transmits the MBO BA signal in accordance with a method determined by the above processing. Thereafter, the communication processing of the wireless communication device 12 ends.

By controlling transmission and reception as described above, it is possible to improve the reliability of notification regarding a reception result in communication using a plurality of bands.

<5. Data Configuration>
<Format Configuration Example of Frame in Which MBO BA Signal is Stored>

Figure 9:
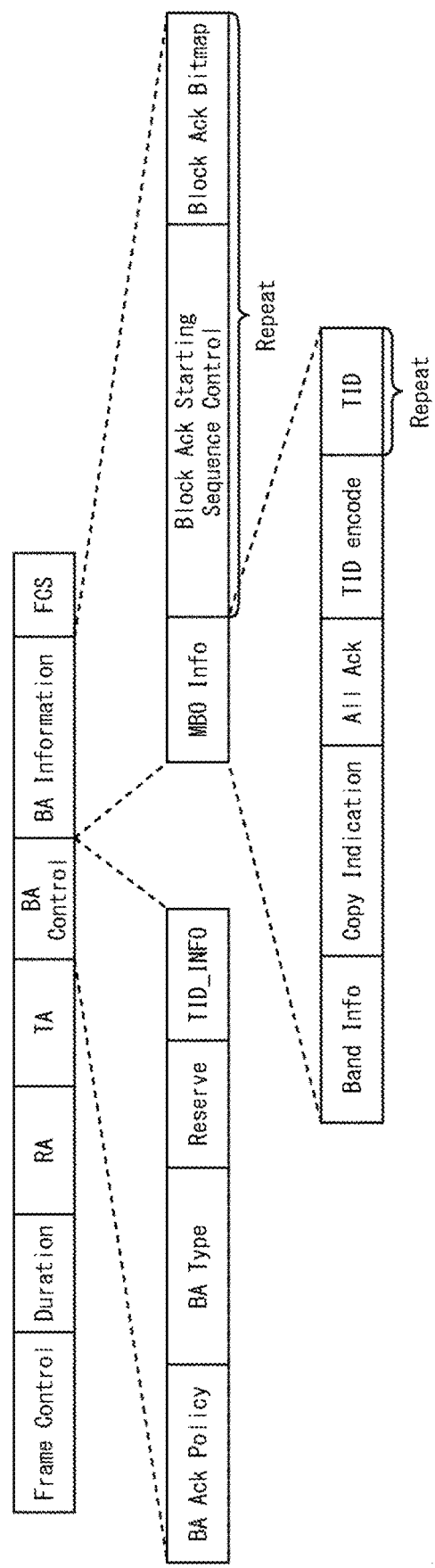
FIG. 9 is a view showing a format configuration example of a frame in which an MBO BA signal is stored.

FIG. 9 is a view showing a format configuration example of a frame in which an MBO BA signal is stored.

The frame in FIG. 9 includes each field of Frame Control, Duration, RA, TA, BA Control, BA Information, and FCS. This frame is included in a MAC protocol data unit (MPDU), which is a data unit in a MAC layer.

The field of Frame Control contains information regarding a type of such the frame. The field of Duration contains information regarding a length of such the frame. The field of RA contains information regarding a destination address of such the frame. The field of TA contains information regarding a source address of such the frame.

The field of BA Control includes each field of BA Ack Policy, BA Type, Reserve, and TID_INFO.

The field of BA Ack Policy contains information regarding a transmission timing of a reception result. The field of BA Type contains information indicating that such the frame contains a reception result for data transmitted using a plurality of bands. The field of Reserve contains reserved bits. The field of TID_INFO contains information regarding the number of types of transmitted data.

The field of BA Information includes each field of MBO Info, Block Ack Starting Sequence Control, and Block Ack Bitmap. The fields of Block Ack Starting Sequence Control and Block Ack Bitmap are repeated for the number of bands.

The field of MBO Info includes each field of Band Info, Copy Indication, All Ack, Traffic ID (TID) encode, and TID.

The field of Band Info contains information regarding a band to which data for notifying a reception result has been transmitted in such the frame. For example, bits respectively corresponding to the first band, the second band, and the third band are provided, and in which band the data with respect to the reception result has been transmitted is indicated by setting the bit.

The field of Copy Indication contains information indicating that an MBO BA signal containing such the frame containing the same contents will be transmitted in a band different from the band in which the MBO BA signal that stores such the frame is transmitted.

The field of All Ack contains information indicating that all reception results are successful in demodulation.

The field of TID encode contains information indicating in which band the data corresponding to a reception result of the subsequent TID is transmitted.

The field of TID contains information regarding an identifier of a type of data for notifying of a reception result. For example, the field of TID encode shows the number of types of data for notifying a reception result in each of the first band, the second band, and the third band.

As a specific example, in a case where the field of TID encode shows that the number of contained types of data for notifying a reception result is four in the first band, two in the second band, and one in the third band, the subsequent field of TID is repeated seven times. In this case, in the field of TID, the first four are information indicating an identifier regarding a type of data transmitted in the first band, the next two are information indicating an identifier regarding a type of data transmitted in the second band, and the last two are information indicating an identifier regarding a type of data transmitted in the third band.

The field of Block Ack Starting Sequence Control contains information regarding an identifier indicating an order of the first data for which a reception result is to be notified.

The field of Block Ack Bitmap contains information regarding a reception result regarding each data in a bitmap form.

Note that the example of the format configuration of the frame shown in FIG. 9 is an example, and the frame of the present technology may be configured in another format.

<Format Configuration Example of Frame in Which MBO BA Setup Signal is Stored>

FIG. 10 is a view showing a format configuration example of a frame in which an MBO BA Setup signal is stored.

The frame in FIG. 10 includes each field of BA Band Info, Number of Data, Buffer size, TID_INFO, Sequence Number Info, Retry Limit, Life Time, and BA Timing. This frame is also included in the MPDU, which is a data unit in the MAC layer, for example.

The BA Band Info contains information regarding a band in which the wireless communication device 11 transmits data or a band in which the wireless communication device 12 notifies of a reception result.

The field of Number of Data contains information regarding the number of data transmitted and received by the wireless communication device 11 and the wireless communication device 12.

The field of Buffer Size contains information regarding a size of data transmitted and received by the wireless communication device 11 and the wireless communication device 12.

The field of TID_INFO contains information regarding the number of types of data transmitted and received by the wireless communication device 11 and the wireless communication device 12, and regarding an identifier indicating the type.

The field of Sequence Number Info contains information regarding an identifier indicating an order of data transmitted and received by the wireless communication device 11 and the wireless communication device 12.

The field of Retry Limit contains information regarding a maximum number of retransmissions of data communicated by the wireless communication device 11 and the wireless communication device 12.

The field of Life Time contains information regarding time until data communicated by the wireless communication device 11 and the wireless communication device 12 is discarded.

The field of BA Timing contains information regarding a method for the wireless communication device 12 to notify of a reception result, and regarding a transmission timing of notification.

Note that a format of the frame in which a Response signal is stored also has a configuration similar to the configuration of the frame shown in FIG. 10. Furthermore, a format configuration of the frame in which the Response signal is stored may contain information indicating approval for each piece of information notified by the MBO BA Setup signal. Moreover, the format configuration of the frame in which the Response signal is stored may contain only information indicating disapproval for each piece of information notified by the MBO BA Setup signal.

<Format Configuration Example Used for Data Signal>

Figure 11:
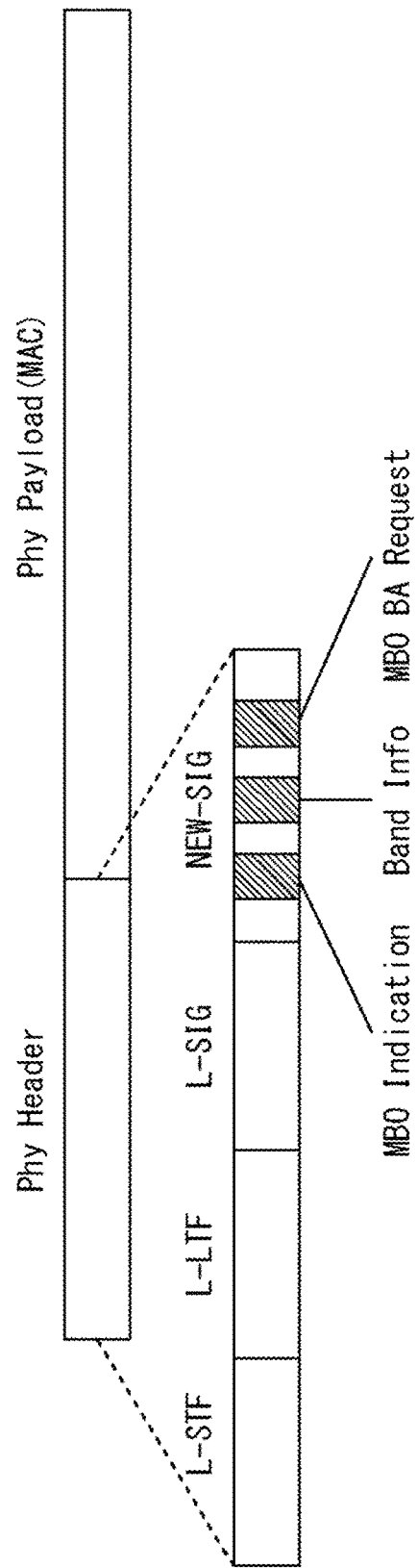
FIG. 11 is a view showing a format configuration example used for a Data signal.

FIG. 11 is a view showing a format configuration example used for a Data signal.

The Data signal of FIG. 11 includes a physical header (Phy Header) arranged at the beginning and a physical payload (Phy Payload).

The Phy Header may contain legacy short training field (L-STF), legacy long training field (L-LTF), and legacy signal field (L-SIG).

In the Phy Header of FIG. 11, after the L-SIG, there is arranged a NEW-SIG, which is an area for storing communication information that is information regarding communication using a plurality of bands and regarding notification of the reception result.

The NEW-SIG contains each field of MBO Indication, Band Info, and MBO BA Request as fields that contain communication information.

The field of MBO Indication contains information indicating that a Data signal transmitted using such the format is transmitted using a plurality of bands.

The field of Band Info contains information regarding a band in which the Data signal transmitted using such the format is transmitted.

The field of MBO BA Request contains information indicating that the band in which the Data signal transmitted using such the format is transmitted is a band in which a reception result for data stored in the Data signal is transmitted.

Note that the data contained in the Data signal transmitted using such the format is stored in Phy Payload.

<6. Hardware Configuration>
<Computer Configuration Example>

The series of processes described above can be executed by hardware or software. In a case of executing the series of processes by software, a program that forms the software is installed from a program recording medium to a computer incorporated in dedicated hardware, to a general-purpose personal computer, or the like.

FIG. 12 is a block diagram showing a configuration example of hardware of a computer that executes the series of processes described above in accordance with a program.

A central processing unit (CPU) 301, a read only memory (ROM) 302, and a random access memory (RAM) 303 are mutually connected by a bus 304.

The bus 304 is further connected with an input/output interface 305. The input/output interface 305 is connected with an input unit 306 including a keyboard, a mouse, and the like, and an output unit 307 including a display, a speaker, and the like. Furthermore, the input/output interface 305 is connected with a storage unit 308 including a hard disk, a non-volatile memory, and the like, a communication unit 309 including a network interface and the like, and a drive 310 that drives a removable medium 311.

In the computer configured as described above, the series of processes described above are performed, for example, by the CPU 301 loading a program recorded in the storage unit 308 into the RAM 303 via the input/output interface 305 and the bus 304, and executing.

The program to be executed by the CPU 301 is provided, for example, by being recorded on the removable medium 311 or via wired or wireless transfer media such as a local area network, the Internet, and digital broadcasting, to be installed in the storage unit 308.

Note that the program executed by the computer may be a program that performs processing in a time series according to an order described in this specification, or may be a program that performs processing in parallel or at necessary timing such as when a call is made.

<7. Other>

As described above, in the present technology, control is performed to transmit, by using any band of two or more bands, a Setup signal containing setting information regarding a setting of a notification method for a reception result used for communication in the two or more bands, and to transmit a Data signal containing data by using the two or more bands.

As a result, information regarding a reception result of communication using a plurality of bands can be efficiently shared between the transmission side and the reception side without wasting resources.

Furthermore, according to the present technology, by giving redundancy to a content related to a reception result, it is possible to share between the transmission side and the reception side with high reliability.

According to the present technology, by avoiding transmission of information regarding a reception result in a band with poor propagation characteristics, data that requires retransmission can be retransmitted in a band with good propagation characteristics.

According to the present technology, it is possible to efficiently notify of a reception result of data transmitted in a plurality of bands.

According to the present technology, it is possible to maintain affinity with the existing communication standard (IEEE802.11), suppress an adverse effect on the existing terminal, and enable coexistence.

Moreover, according to the present technology, high communication quality can be achieved in communication using a plurality of bands, and it is possible to improve a peak rate related to data transmission, improve throughput, and improve reliability.

Note that, in this specification, the system means a set of a plurality of components (a device, a module (a part), and the like), and it does not matter whether or not all the components are in the same housing. Therefore, a plurality of devices housed in separate housings and connected via a network, and a single device with a plurality of modules housed in one housing are both systems.

Note that the effects described in this specification are merely examples and are not limited, and other effects may also be present.

The embodiment of the present technology is not limited to the above-described embodiment, and various modifications can be made without departing from the scope of the present technology.

For example, the present technology can have a cloud computing configuration in which one function is shared and processed in cooperation by a plurality of devices via a network.

Furthermore, each step described in the above-described flowchart can be executed by one device, and also shared and executed by a plurality of devices.

Moreover, in a case where one step includes a plurality of processes, the plurality of processes included in the one step can be executed by one device, and also shared and executed by a plurality of devices.

<Combination Example of Configuration>

The present technology can also have the following configurations.

(1)

A wireless communication device including:

a transmission control unit configured to control to transmit, by using any band of two or more bands, a Setup signal containing setting information regarding a setting of a notification method for a reception result used for communication in the two or more bands, and to transmit a Data signal containing data by using the two or more bands.

(2)

The wireless communication device according to (1) above, in which the setting information is first communication information regarding communication and retransmission between a first wireless communication device and a second wireless communication device.

(3)

The wireless communication device according to (2) above, in which the first communication information is information regarding a band in which the first wireless communication device transmits the Data signal.

(4)

The wireless communication device according to (2) or (3) above, in which the first communication information is information regarding a band in which the second wireless communication device notifies of the reception result.

(5)

The wireless communication device according to any one of (2) to (4) above, in which the first communication information is information regarding the Data signal transmitted and received by the first wireless communication device and the second wireless communication device.

(6)

The wireless communication device according to any one of (2) to (5) above, in which the first communication information is at least either one of information regarding a maximum number of retransmissions of the Data signal transmitted and received by the first wireless communication device and the second wireless communication device, or information regarding time until discarding.

(7)

The wireless communication device according to any one of (2) to (6) above, in which the first communication information is information regarding a method for the second wireless communication device to notify of the reception result and regarding a transmission timing of notification of the reception result.

(8)

The wireless communication device according to any one of (1) to (7) above, in which the Setup signal is transmitted in a first band among the two or more bands.

(9)

The wireless communication device according to any one of (1) to (8) above, in which the Data signal is transmitted containing a second communication information regarding communication using the two or more bands and regarding notification of the reception result.

(10)

The wireless communication device according to (9) above, in which the second communication information is information indicating that the Data signal is transmitted using the two or more bands.

(11)

The wireless communication device according to (9) or (10) above, in which the second communication information is information regarding a band in which the Data signal is transmitted.

(12)

The wireless communication device according to any one of (9) or (11) above, in which the second communication information is information indicating that notification regarding the reception result is performed in a band in which the Data signal is transmitted.

(13)

A wireless communication method including:

by a wireless communication device, controlling to transmit, by using any band of two or more bands, a Setup signal containing setting information regarding a setting of a notification method for a reception result used for communication in the two or more bands, and to transmit a Data signal containing data by using the two or more bands.

(14)

A wireless communication device including:

a reception unit configured to receive setting information regarding a setting of a notification method for a reception result regarding communication in two or more bands; and a transmission unit configured to transmit a reception result for data transmitted using the two or more bands, on the basis of the setting information.

(15)

The wireless communication device according to (14) above, in which a reception result for the data is transmitted by a block ack (BA) signal containing a reception result regarding communication in the two or more bands.

(16)

The wireless communication device according to (15), in which the BA signal contains information indicating that a reception result relates to communication in the two or more bands.

(17)

The wireless communication device according to (15) or (16) above, in which the BA signal contains information regarding a band in which the data has been transmitted, the data being for notifying of a reception result regarding communication in the two or more bands.

(18)

The wireless communication device according to any one of (15) to (17) above, in which the BA signal contains information indicating that a same reception result is notified in another band.

(19)

The wireless communication device according to any one of (15) to (18) above, in which the BA signal contains information regarding a type of the data for a reception result, the data being transmitted in the two or more bands.

(20)

The wireless communication device according to any one of (15) to (19) above, in which the BA signal contains a reception result corresponding to the data transmitted in the two or more bands.

(21)

A wireless communication method including:

by a wireless communication device, with a reception unit configured to receive setting information regarding a setting of a notification method for a reception result regarding communication in two or more bands, transmitting a reception result for data transmitted using the two or more bands, on the basis of the setting information.

REFERENCE SIGNS LIST

11 Wireless communication device
12 Wireless communication device
31 Control unit
32 Power supply unit
31, 33-1 to 33-3 Communication unit
51 Data processing unit
52 Wireless control unit
53 Modulation/demodulation unit
54 Signal processing unit
55 Channel estimation unit
56, 56-1 to 56-N Wireless I/F unit
57, 57-1 to 57-N Amplifier unit
58-1 to 58-N Antenna
61 Transmission control unit
62 Reception control unit

The invention claimed is:

1. A wireless communication device comprising:
a transceiver; and
a control circuit configured to control the transceiver to:
transmit, via any band of a first and second band, a Setup signal to a second wireless device, the Setup signal containing setting information
wherein the setting information:
identifies which of the first and second bands will be respectively used by the wireless device for a future transmission of a first and second data signal, the first data signal including a first block of multiple sets of data, and the second data signal including a second block of multiple sets of data, and
identifies whether one or both of the first and second bands are to be used by the second wireless device to send at least one block acknowledgement (BA) with respect to the first and second block of multiple sets of data,
based on the setting information, transmit the first and second data signals in the first and second bands, respectively, and
receive the at least one BA for at least one of the first and second block of multiple sets of data in the one or more of the first and second bands identified in the setting information.

2. The wireless communication device according to claim 1, wherein the setting information instructs the second wireless device to transmit a single BA for each of the first and second block of multiple sets of data in a single band of the first and second bands.

3. The wireless communication device according to claim 1, wherein the setting information instructs the second wireless device to transmit respective first and second BAs for the first and second block of multiple sets of data in respective ones of the first and second bands.

4. The wireless communication device according to claim 1,
wherein the setting information includes further instructions that instruct the second wireless device to:
prior to transmitting either of the first and second BAs, measure first and second channel qualities in respective ones of the first and second bands,
transmit respective first and second BAs for the first and second block of multiple sets of data in respective ones of the first and second bands based on the first and second channel qualities meeting a predetermined threshold, or
transmit a single BA for each of the first and second block of multiple sets of data in a single band of the first and second bands based on one of the first and second channel qualities not meeting a predetermined threshold, and
wherein the at least one BA is received according to the further instructions.

5. The wireless communication device according to claim 1, wherein the setting information further identifies:
a maximum number of retransmissions of each of the first and second data signals, and
information regarding time until discarding each of the first and second data signals.

6. The wireless communication device according to claim 1, wherein the setting information further identifies a transmission timing of each of the at least one BA by the second wireless communication device.

7. The wireless communication device according to claim 1, wherein each of the first and second data signals contain a second communication information.

8. The wireless communication device according to claim 7, wherein the second communication information is information indicating that a corresponding one of the first and second data signals is transmitted using the two or more bands.

9. The wireless communication device according to claim 7, wherein the second communication information is information regarding a band in which a corresponding one of the first and second data signals is transmitted.

10. The wireless communication device according to claim 7, wherein the second communication information is information indicating that notification regarding the reception result is performed in a band in which a corresponding one of the first and second data signals is transmitted.

11. A method performed by a wireless communication device, the method comprising:
- transmitting, via any band of a first and second band, a Setup signal to a second wireless device, the Setup signal containing setting information,
- wherein the setting information:
  - identifies which of the first and second bands will be respectively used by the wireless device for a future transmission of a first and second data signal, the first data signal including a first block of multiple sets of data, and the second data signal including a second block of multiple sets of data, and
  - identifies whether one or both of the first and second bands are to be used by the second wireless device to send at least one block acknowledgement (BA) with respect to the first and second block of multiple sets of data,
- based on the setting information, transmitting the first and second data signals in the first and second bands, respectively, and
- receiving the at least one BA for at least one of the first and second block of multiple sets of data in the one or more of the first and second bands identified in the setting information.

12. The method according to claim 11,
wherein the setting information includes further instructions that instruct the second wireless device to:
- prior to transmitting either of the first and second BAs, measure first and second channel qualities in respective ones of the first and second bands,
- transmit respective first and second BAs for the first and second block of multiple sets of data in respective ones of the first and second bands based on the first and second channel qualities meeting a predetermined threshold, or
- transmit a single BA for each of the first and second block of multiple sets of data in a single band of the first and second bands based on one of the first and second channel qualities not meeting a predetermined threshold, and
wherein the receiving the at least one BA comprises receiving the at least one BA according to the further instructions.

13. A wireless communication device comprising:
a transceiver; and
a control circuit configured to control the transceiver to:
- receive, via any band of a first and second band, a Setup signal to a second wireless device, the Setup signal containing setting information
- wherein the setting information:
  - identifies which of the first and second bands will be respectively used by the wireless device for a future transmission of a first and second data signal, the first data signal including a first block of multiple sets of data, and the second data signal including a second block of multiple sets of data, and
  - identifies whether one or both of the first and second bands are to be used by the second wireless device to send at least one block acknowledgement (BA) with respect to the first and second block of multiple sets of data,
- based on the setting information, receive the first and second data signals in the first and second bands, respectively, and
- transmit the at least one BA for at least one of the first and second block of multiple sets of data in the one or more of the first and second bands identified in the setting information.

14. The wireless communication device according to claim 13, wherein the setting information instructs the second wireless device to transmit a single BA for each of the first and second block of multiple sets of data in a single band of the first and second bands.

15. The wireless communication device according to claim 13, wherein the setting information instructs the second wireless device to transmit respective first and second BAs for the first and second block of multiple sets of data in respective ones of the first and second bands.

16. The wireless communication device according to claim 13, wherein the setting information includes further instructions that instruct the second wireless device to:
- prior to transmitting either of the first and second BAs, measure first and second channel qualities in respective ones of the first and second bands,
- transmit respective first and second BAs for the first and second block of multiple sets of data in respective ones of the first and second bands based on the first and second channel qualities meeting a predetermined threshold, or
- transmit a single BA for each of the first and second block of multiple sets of data in a single band of the first and second bands based on one of the first and second channel qualities not meeting a predetermined threshold, and
wherein the at least one BA is transmitted according to the further instructions.

17. The wireless communication device according to claim 13, wherein the setting information further identifies:
- a maximum number of retransmissions of each of the first and second data signals, and
- information regarding time until discarding each of the first and second data signals.

18. The wireless communication device according to claim 13, wherein the setting information further identifies a transmission timing of each of the at least one BA by the second wireless communication device.

19. A method performed by a wireless communication device, the method comprising:
- receiving, via any band of a first and second band, a Setup signal to a second wireless device, the Setup signal containing setting information
- wherein the setting information:
  - identifies which of the first and second bands will be respectively used by the wireless device for a future transmission of a first and second data signal, the first data signal including a first block of multiple sets of data, and the second data signal including a second block of multiple sets of data, and
  - identifies whether one or both of the first and second bands are to be used by the second wireless device to send at least one block acknowledgement (BA) with respect to the first and second block of multiple sets of data,
- based on the setting information, receiving the first and second data signals in the first and second bands, respectively, and
- transmitting the at least one BA for at least one of the first and second block of multiple sets of data in the one or more of the first and second bands identified in the setting information.

20. The method according to claim 19,
wherein the setting information includes further instructions that instruct the second wireless device to:
prior to transmitting either of the first and second BAs, measure first and second channel qualities in respective ones of the first and second bands,
transmit respective first and second BAs for the first and second block of multiple sets of data in respective ones of the first and second bands based on the first and second channel qualities meeting a predetermined threshold, or
transmit a single BA for each of the first and second block of multiple sets of data in a single band of the first and second bands based on one of the first and second channel qualities not meeting a predetermined threshold, and
wherein the transmitting the at least one BA comprises transmitting the at least one BA according to the further instructions.

\* \* \* \* \*